(12) United States Patent
Kawamura et al.

(10) Patent No.: US 9,199,600 B2
(45) Date of Patent: Dec. 1, 2015

(54) HEAD-PROTECTING AIRBAG DEVICE

(71) Applicant: TOYODA GOSEI CO., LTD., Kiyosu-shi, Aichi-ken (JP)

(72) Inventors: Koji Kawamura, Kiyosu (JP); Yasushi Masuda, Kiyosu (JP); Masaaki Okuhara, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/551,220

(22) Filed: Nov. 24, 2014

(65) Prior Publication Data
US 2015/0151708 A1 Jun. 4, 2015

(30) Foreign Application Priority Data
Nov. 29, 2013 (JP) .................. 2013-248481

(51) Int. Cl.
| B60R 21/16 | (2006.01) |
| B60R 21/233 | (2006.01) |
| B60R 21/213 | (2011.01) |
| B60R 21/26 | (2011.01) |
| B60R 21/232 | (2011.01) |
| B60R 21/237 | (2006.01) |
| B60R 21/231 | (2011.01) |
| B60R 21/2338 | (2011.01) |

(52) U.S. Cl.
CPC .............. *B60R 21/233* (2013.01); *B60R 21/213* (2013.01); *B60R 21/232* (2013.01); *B60R 21/237* (2013.01); *B60R 21/26* (2013.01); *B60R 21/2338* (2013.01); *B60R 2021/23107* (2013.01)

(58) Field of Classification Search
CPC .. B60R 21/232; B60R 21/237; B60R 21/2338
USPC ................................ 280/743.1, 743.2, 730.2
See application file for complete search history.

(56) References Cited

U.S. PATENT DOCUMENTS

| 8,672,347 B2 * | 3/2014 | Schneider et al. ............ 280/733 |
| 8,840,137 B2 * | 9/2014 | Schneider et al. ............ 280/733 |
| 8,960,716 B2 * | 2/2015 | Takeuchi .................... 280/730.2 |

FOREIGN PATENT DOCUMENTS

JP 2012-96780 A 5/2012

* cited by examiner

*Primary Examiner* — Faye M Fleming
(74) *Attorney, Agent, or Firm* — Posz Law Group, PLC

(57) ABSTRACT

An airbag of a head-protecting airbag device includes a bag body, a tension belt extending from a front region of the bag body and a tether for covering an outer circumference of the bag body. The bag body includes a terminal inflatable portion and a central inflatable portion. The tension belt is disposed along a front and rear direction of the bag body so as to be deployable on an outboard side of the terminal inflatable portion. The tether is run through a slit formed on a partitioning portion which partitions the terminal inflatable portion from the central inflatable portion and covers an inboard side of the terminal inflatable portion and an outboard side of the central inflatable portion.

5 Claims, 7 Drawing Sheets

HEAD-PROTECTING AIRBAG DEVICE

CROSS REFERENCE TO RELATED APPLICATIONS

The Present application claims priority from Japanese Patent Application No. 2013-248481 of Kawamura, filed on Nov. 29, 2013, the disclosure of which is hereby incorporated into the present application by reference.

BACKGROUND OF THE INVENTION

1. Field of the Invention

The present invention relates to a head-protecting airbag device whose airbag is mountable on an upper periphery of a window of a vehicle at an inboard side of the window in a folded-up configuration with an upper edge thereof secured to a vehicle body structure and is deployable downward over the window when fed with an inflation gas. Particularly, the invention relates to a head-protecting airbag device that operates adequately in the event of an oblique crash where an impact force acts on a vehicle obliquely either from the front or rear.

2. Description of Related Art

JP2012-96780 discloses a known head-protecting airbag device. The airbag of the airbag device is mounted on a vehicle body structure at an upper edge thereof. The airbag includes a bag body for covering an inboard side of a window, a tension belt which extends from a front end region of the bag body and fixed at the leading end to the peripheral edge of the window, and a position holding section which is a sheet in shape and covers an inboard side of the front end region of the bag body. In this conventional head-protecting airbag device, the bag body includes a terminal inflatable portion which is located at the front end of the bag body at deployment, a central inflatable portion which is located at the rear of and adjacent to the terminal inflatable portion, and a partitioning portion which partitions the terminal inflatable portion and central inflatable portion. The front end of the position holding section is connected to the front edge of the terminal inflatable portion and the rear end of the position holding section is connected to the rear edge of the central inflatable portion, thus the position holding section extends across the terminal inflatable portion and central inflatable portion. The root section of the tension belt is jointed to the partitioning portion partitioning the terminal inflatable portion and central inflatable portion, and the tension belt extends forward on an outboard side of the terminal inflatable portion. The width of the position holding section in a front and rear direction is smaller than that of the terminal inflatable portion and central inflatable portion in a condition where the bag body is inflated by itself.

When the airbag of the conventional head-protecting airbag device is deployed, the position holding section is deployed over the inboard side of the terminal inflatable portion and central inflatable portion while the tension belt extends forward from the partitioning portion which partitions the terminal inflatable portion and central inflatable portion. That is, since the position holding section has a short width, it is tensed on the inboard side of the bag body at airbag deployment, thus is capable of protecting a head of a vehicle occupant by its entire area despite of an existence of the partitioning portion between the terminal inflatable portion and central inflatable portion. Further, with the tension generated in the position holding section in a front and rear direction, the front end of the terminal inflatable portion is pulled toward an interior of a vehicle. The tension belt also pushes the terminal inflatable portion toward a vehicle interior such that the terminal inflatable portion is disposed farther inside of a vehicle interior than the central inflatable portion at airbag deployment with a tension generated in a front and rear direction.

That is, the conventional head-protecting airbag device uses the tensions of the tension belt and position holding section in order to deploy the terminal inflatable portion toward a vehicle interior. Although the position holding section pulls the front end of the terminal inflatable portion as well as the central inflatable portion by its tension, the tension belt pushes the terminal inflatable portion toward a vehicle interior but not the central inflatable portion since the tension belt extends from the partitioning portion between the terminal inflatable portion and central inflatable portion. Therefore, an improvement has been expected in order to deploy the central inflatable portion toward a vehicle interior as well.

SUMMARY OF THE INVENTION

An object of the present invention is to provide a head-protecting airbag device that is capable of deploying a terminal inflatable portion located at a terminal in a front and rear direction of an airbag and a central inflatable portion adjoining the terminal inflatable portion considerably toward a vehicle interior at airbag deployment and consequently protecting a head of a vehicle occupant adequately in the event of an oblique crash.

The object of the invention will be achieved by the following head-protecting airbag device:

The head-protecting airbag device has an airbag that is mountable on an upper edge of a window of a vehicle on an inboard side of a vehicle in a folded-up configuration with the upper edge secured to a vehicle body structure. The airbag is deployable downward over the window when fed with an inflation gas from an inflator. The airbag includes:

a bag body that is formed into a flexible bag and mountable on the upper edge of the window of the vehicle body structure at a plurality of positions arranged along a front and rear direction of an upper edge of the bag body, the bag body comprising a terminal inflatable portion located at a terminal in a front and rear direction of the bag body, a central inflatable portion adjoining the terminal inflatable portion and located toward a center in a front and rear direction of the bag body and a partitioning portion that is disposed generally along an up and down direction to partition the terminal inflatable portion from the central inflatable portion;

a tension belt that is formed of a flexible band member and connected to the bag body at a first end so as to be deployable on an outboard side of the terminal inflatable portion and extend along a front and rear direction, a second end of the tension belt being adapted to be secured to the vehicle body structure at a periphery of the window distant from the bag body; and a tether that is formed of a flexible band member separately from the tension belt, a first end in a front and rear direction of the tether being connected to a periphery of the terminal inflatable portion on the part of the terminal in a front and rear direction of the bag body whereas a second end in a front and rear direction of the tether being connected to a periphery of the central inflatable portion on the part of the center in a front and rear direction of the bag body such that the tether extends across the terminal inflatable portion and central inflatable portion generally along a front and rear direction, the tether being disposed in a vicinity of a center in an up and down direction of the bag body and having a width in a front and rear direction that is smaller than a width in a front and rear direction of a region from the terminal inflatable portion to the central inflatable portion in a condition where the bag body is inflated by itself, and the tether being run through a slit formed on the partitioning portion, thereby covering an inboard side of the terminal inflatable portion and an outboard side of the central inflatable portion.

In the head-protecting airbag device of the invention, the tether is formed of a flexible band member, and opposite ends in a front and rear direction of the tether are connected to the periphery of the terminal inflatable portion on the part of the terminal in a front and rear direction of the bag body and to the periphery of the central inflatable portion on the part of the center in a front and rear direction of the bag body. The tether is run through the slit formed on the partitioning portion located between the terminal inflatable portion and central inflatable portion, thus covers an inboard side of the terminal inflatable portion and an outboard side of the central inflatable portion at airbag deployment. Further, the width in a front and rear direction of the tether is smaller than the width in a front and rear direction of the region from the terminal inflatable portion to the central inflatable portion in a condition where the bag body is inflated by itself. With this configuration, a tension will be exerted in the tether along a front and rear direction at airbag deployment, and since the tether is disposed on the outboard side of the central inflatable portion, the tether will push the central inflatable portion toward an interior of a vehicle with the aid of the tension. At this time, since the tether is disposed on an inboard side of the terminal inflatable portion, the terminal inflatable portion will be restrained from protruding toward a vehicle interior. However, the tension belt is disposed on the outboard side of the terminal inflatable portion to exert a tension in a front and direction at airbag deployment, and this tension exerted in the tension belt is greater than the tension exerted in the tether. Accordingly, the tension belt will push the terminal inflatable portion considerably toward a vehicle interior. Further, the partitioning portion partitioning the terminal inflatable portion from the central inflatable portion is provided with the slit which the tether is run through, thus the terminal inflatable portion is partially split from the central inflatable portion. This configuration will enable the terminal inflatable portion to move easily relative to the central inflatable portion and to deploy toward a vehicle interior considerably and smoothly.

That is, the head-protecting airbag device of the invention is capable of deploying the central inflatable portion toward a vehicle interior relative to other regions of the bag body with the tension exerted in the tether, and deploying the adjoining terminal inflatable portion farther inward with the tension exerted in the tension belt. Moreover, since the tether is disposed in a vicinity of the center in an up and down direction of the bag body, it is capable of pushing the terminal inflatable portion and central inflatable portion toward a vehicle interior steadily over a wide area in an up and down direction.

Therefore, the head-protecting airbag device of the invention is capable of deploying the terminal inflatable portion located at a terminal in a front and rear direction and the central inflatable portion adjoining the terminal inflatable portion considerably toward a vehicle interior at airbag deployment and consequently protecting an occupant's head adequately in the event of an oblique crash.

In the above airbag device, if the first end of the tension belt is connected to the partitioning portion, the bag body will be deployed in such a manner as to be bent at the partitioning portion, and the terminal inflatable portion will be deployed toward a vehicle interior further smoothly.

It is further desired with the head-protecting airbag device of the invention that:
the bag body includes, in order to protect a head of an occupant in the event of a rollover of a vehicle, a primary inflatable portion inflatable with an inflation gas fed from the inflator and a secondary inflatable portion that is in gas communication with the primary inflatable portion and completes inflation after the primary inflatable portion has completed inflation;
the terminal inflatable portion constitutes the secondary inflatable portion; and
the central inflatable portion constitutes the primary inflatable portion.

With this configuration, in the event of a rollover, which allows more time to take measures than in the event of a side impact, the central inflatable portion (the primary inflatable portion) located closer to an occupant than the terminal inflatable portion (the secondary inflatable portion) will be deployed toward a vehicle interior and quickly arrest the occupant within a vehicle interior.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
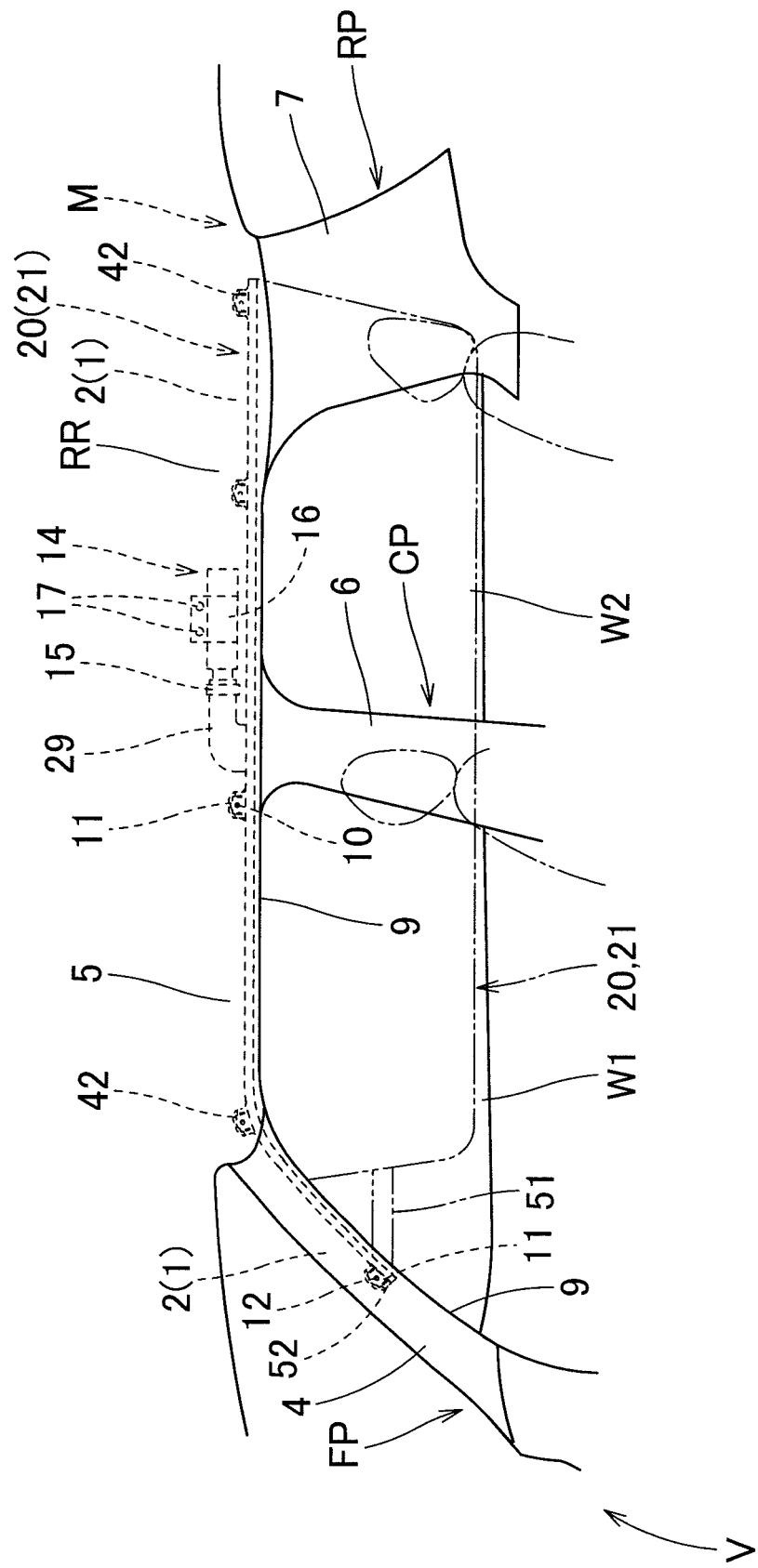
FIG. 1 is a schematic front view of a head-protecting airbag device embodying the invention as viewed from a vehicle interior.

As shown in FIG. 1, a head-protecting airbag device M embodying the present invention is mounted on a vehicle V with two side windows W1 and W2, i.e., with two rows of seats. The head-protecting airbag device M includes an airbag 20, an inflator 14, mounting brackets 11, a mounting bracket 16, and an airbag cover 9. The airbag 20 is housed at upper peripheries of the windows W1 and W2 at an inboard side of the vehicle V in a folded-up configuration, specifically from a lower periphery of a front pillar FP to a region above a rear pillar RP, via a lower periphery of a roof side rail RR.

Figure 7:
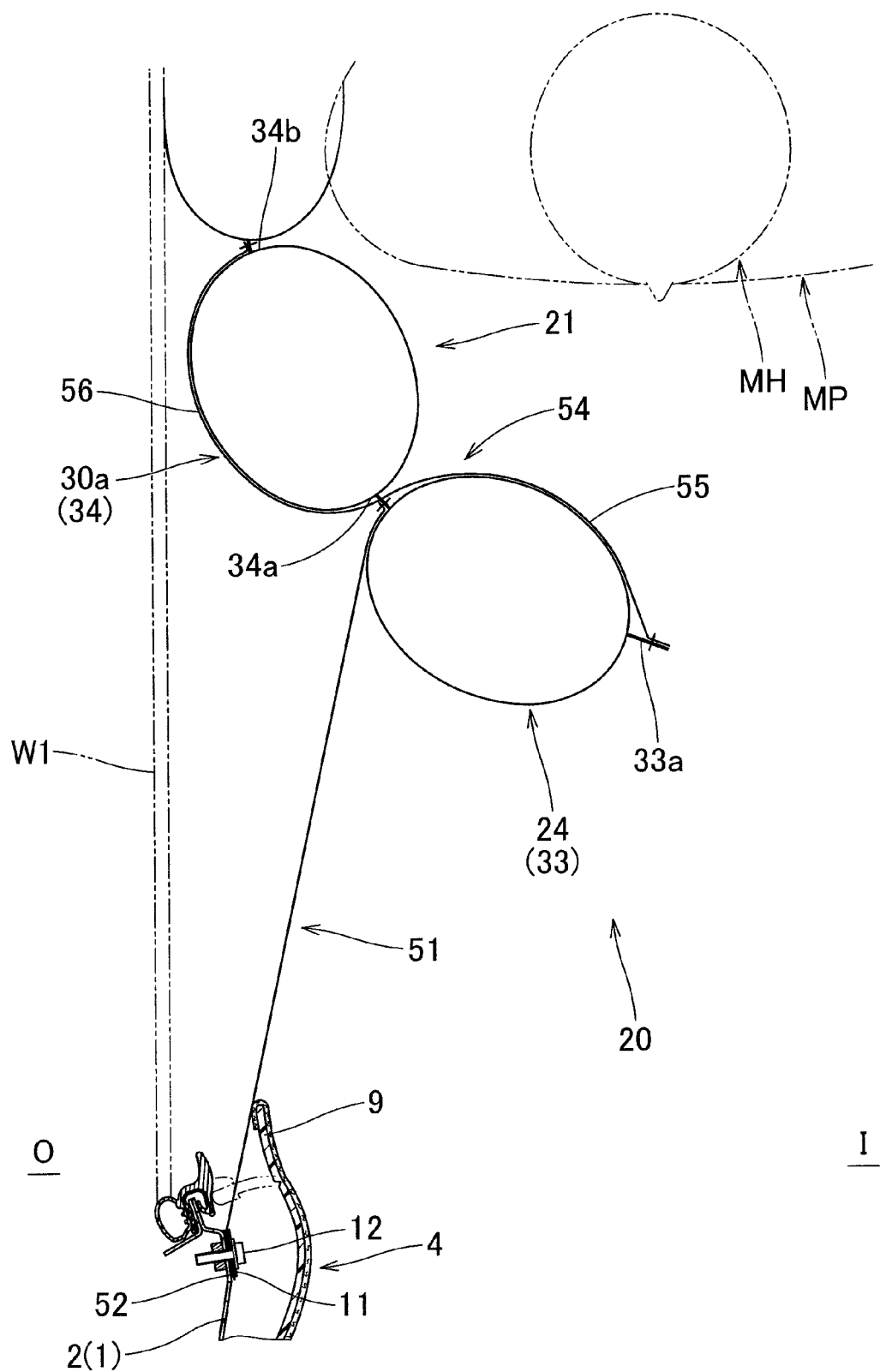
FIG. 7 is a schematic horizontal section of the airbag apparatus taken along a front and rear direction, showing the airbag in an inflated state.

As shown in FIGS. 1 and 7, the airbag cover 9 is constructed of a lower hem of a front pillar garnish 4 arranged on the front pillar FP and a lower hem of a roof head liner 5 arranged on the roof side rail RR. The front pillar garnish 4 and roof head liner 5 are fabricated of synthetic resin and secured to an inner panel 2 of the vehicle body structure 1 at the front pillar FP and roof side rail RR. The airbag cover 9 covers an inboard side of the airbag 20 and is openable toward an interior I of the vehicle when pushed by the airbag 20 under inflation for allowing airbag deployment (FIG. 7).

As shown in FIG. 1, the inflator 14 is substantially columnar in shape and includes at the leading end gas discharge ports (unillustrated) for feeding an inflation gas into the airbag 20. The leading end of the inflator 14 is inserted into a later-described connection port 29 of the airbag 20, and a clamp 15 is mounted around the rear end of the connection port 29, thus the inflator 14 is coupled to the airbag 20. The inflator 14 is secured to the inner panel 2 above the window W2 by a mounting bracket 16 mounted around the inflator 14 and mounting bolts 17. The inflator 14 is electrically connected with an unillustrated control of the vehicle V via an unillustrated lead wire, and is so designed as to be actuated in response to an actuating signal fed from the control that has detected a side impact, an oblique crash or a rollover of the vehicle V.

Mounting brackets 11 are used to mount the airbag 20 on the inner panel 2. Each of the mounting brackets 11 is comprised of a pair of plates of metal, which are applied to inboard and outboard sides of each of later-described mounting portions 42 and 52 of the airbag 20, as shown in FIGS. 1 and 7. Mounting bolts 12 secure the mounting brackets 11, together with the mounting portions 42 and 52, to the inner panel 2.

Figure 2:
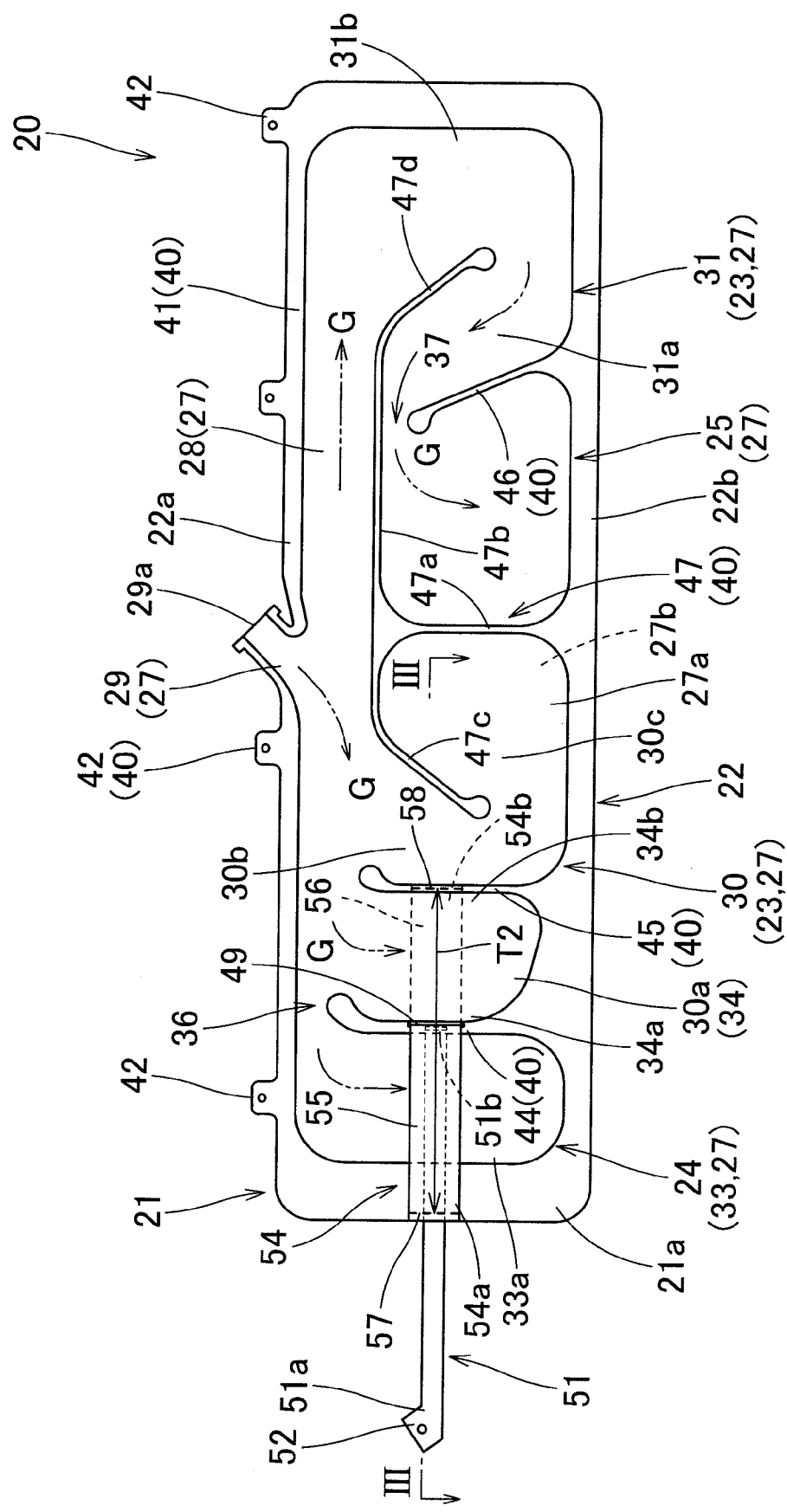
FIG. 2 is a front view of an airbag for use in the airbag device of FIG. 1 in a flattened state.
Figure 3:
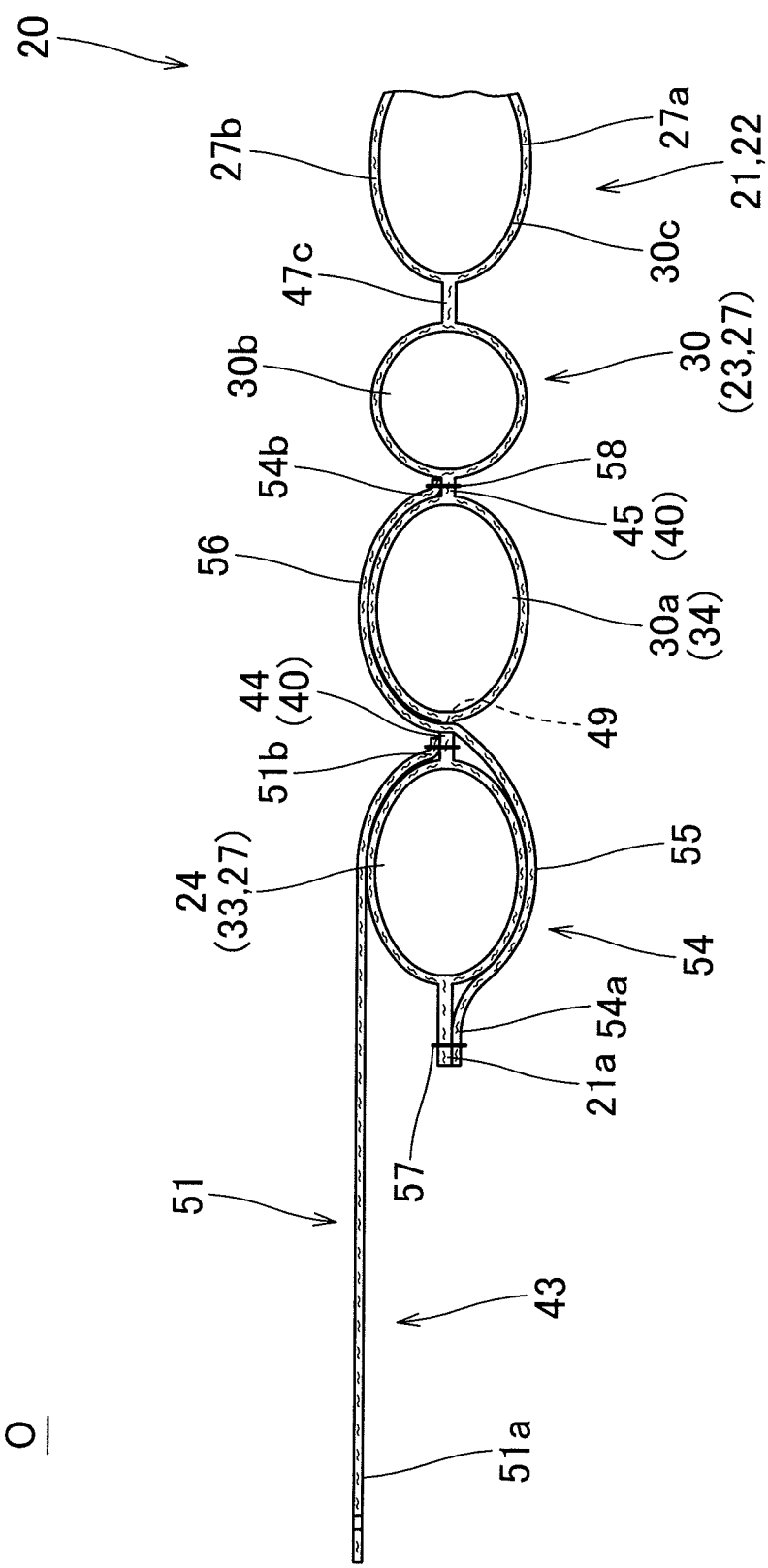
FIG. 3 is a partial enlarged section taken along line III-III of FIG. 2.
Figure 4:
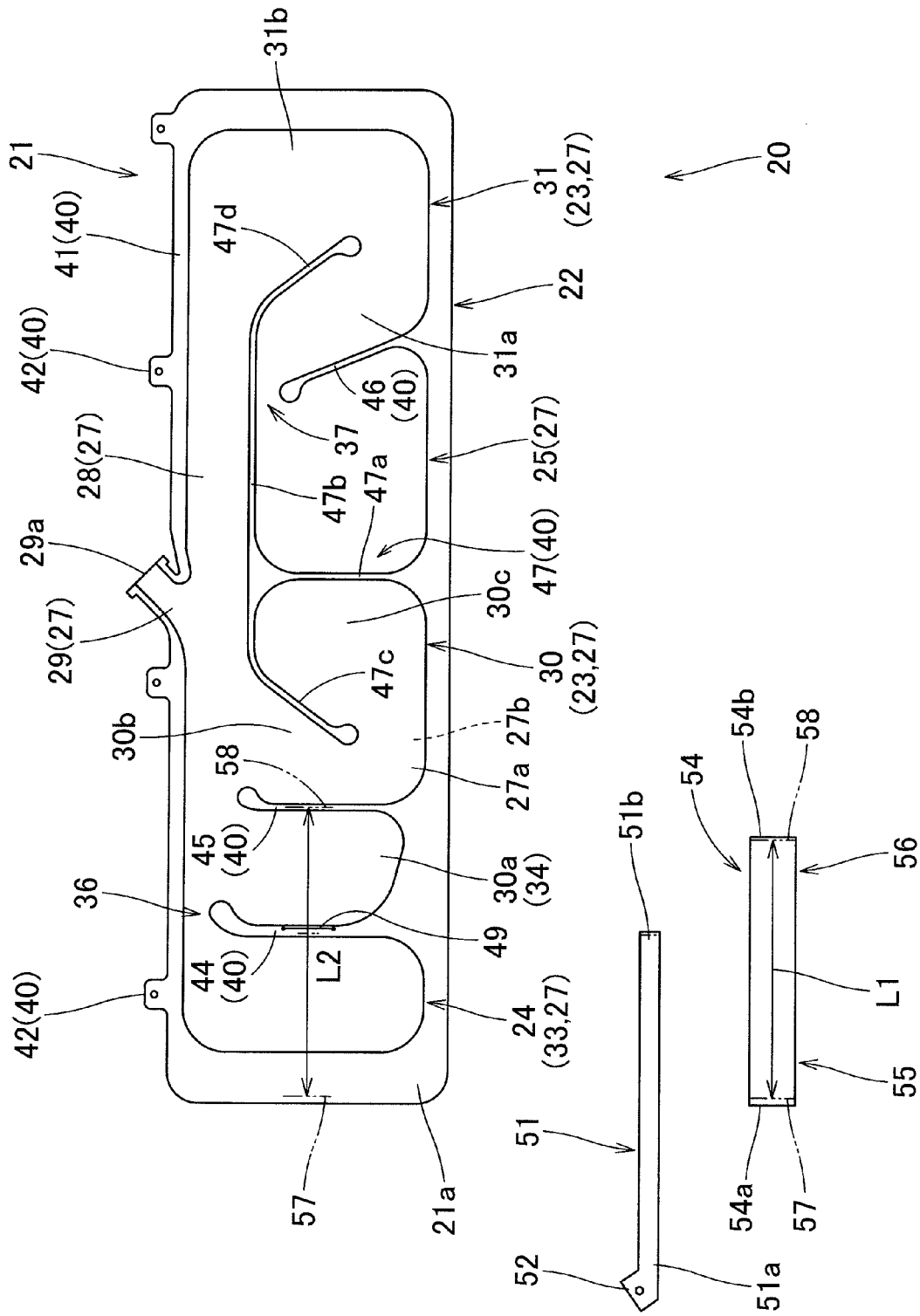
FIG. 4 shows front views of a bag body, a tension belt and a tether of the airbag of FIG. 2.

As shown in FIGS. 2 to 4, the airbag 20 includes a bag body 21, a tension belt 51 which is connected to either front end or rear end region of the bag body 21, and a tether 54 which is so disposed as to cover an outer circumference of the bag body 21. In the illustrated embodiment, the tension belt 51 is connected toward the front end 21a of the bag body 21.

As shown in FIGS. 2 and 4, the bag body 21 includes an inflatable shielding portion 22 deployable over the windows W1 and W2 and a plurality of mounting portions 42 which serve to secure the upper edge 22a of the inflatable shielding portion 22 to the inner panel 2. The inflatable shielding portion 22 is inflatable into a generally rectangular plate shape lengthy in a front and rear direction such that it covers the window W1, center pillar CP, window W2 and up to the front region of the rear pillar RP.

The inflatable shielding portion 22 includes a primary inflatable portion 23 inflatable with an inflation gas fed from the inflator 14 and two secondary inflatable portions; front secondary inflatable portion 24 and a rear secondary inflatable portion 25, which are in gas communication with the primary inflatable portion 23 and complete inflation after the primary inflatable portion 23 has completed inflation. The inflatable shielding portion 22 of the illustrated embodiment is designed to admit inflation gas and inflate generally entirely except at small regions of later-described partitioning portions 44, 45, 46 and 47 which separate the primary inflatable portion 23, front secondary inflatable portion 24 and rear secondary inflatable portion 25.

The bag body 21 of the embodiment is made by hollow-weaving method using polyamide yarns, polyester yarns or the like. As shown in FIGS. 2 to 4, the bag body 21 includes a gas admissive portion 27 which admits an inflation gas to inflate and a non-admissive portion 40 which admits no inflation gas. When an inflation gas is introduced, the gas admissive portion 27 inflates in such a manner that an inboard side wall 27a, which is deployable toward a vehicle interior I, and an outboard side wall 27b, which is deployable toward a vehicle exterior O, are separated from each other.

The gas admissive portion 27 includes a primary inflatable portion 23, a front secondary inflatable portion 24, a rear secondary inflatable portion 25 and communication portions 36 and 37 which provide gas communication between the primary inflatable portion 23 and each of the front secondary inflatable portion 24 and rear secondary inflatable portion 25. The primary inflatable portion 23 includes a gas feed path 28, a connection port 29, a front seat protection portion 30 and a rear seat protection portion 31.

The gas feed path 28 is a generally rod in shape and extends in a front and rear direction of the inflatable shielding portion 22 along an upper edge 22a of the inflatable shielding portion 22, and is arranged over an entire area in a front and rear direction of the primary inflatable portion 23. The gas feed path 28 serves to guide an inflation gas G discharged from the inflator 14 into the front seat protection portion 30 and rear seat protection portion 31 located below the gas feed path 28. At a position slightly forward relative to the center in a front and rear direction of the gas feed path 28 (in other words, generally at the center in a front and rear direction of the inflatable shielding portion 22) is the connection port 29 connected with the inflator 14. The connection port 29 is in gas communication with the gas feed path 28 and projects upward from the gas feed path 28 in an up- and rearwardly slanted fashion. The connection port 29 is open at the rear end 29a. The inflator 14 is inserted therein and fastened with a clamp 15, thus the connection port 29 and the inflator 14 are connected.

Figure 5:
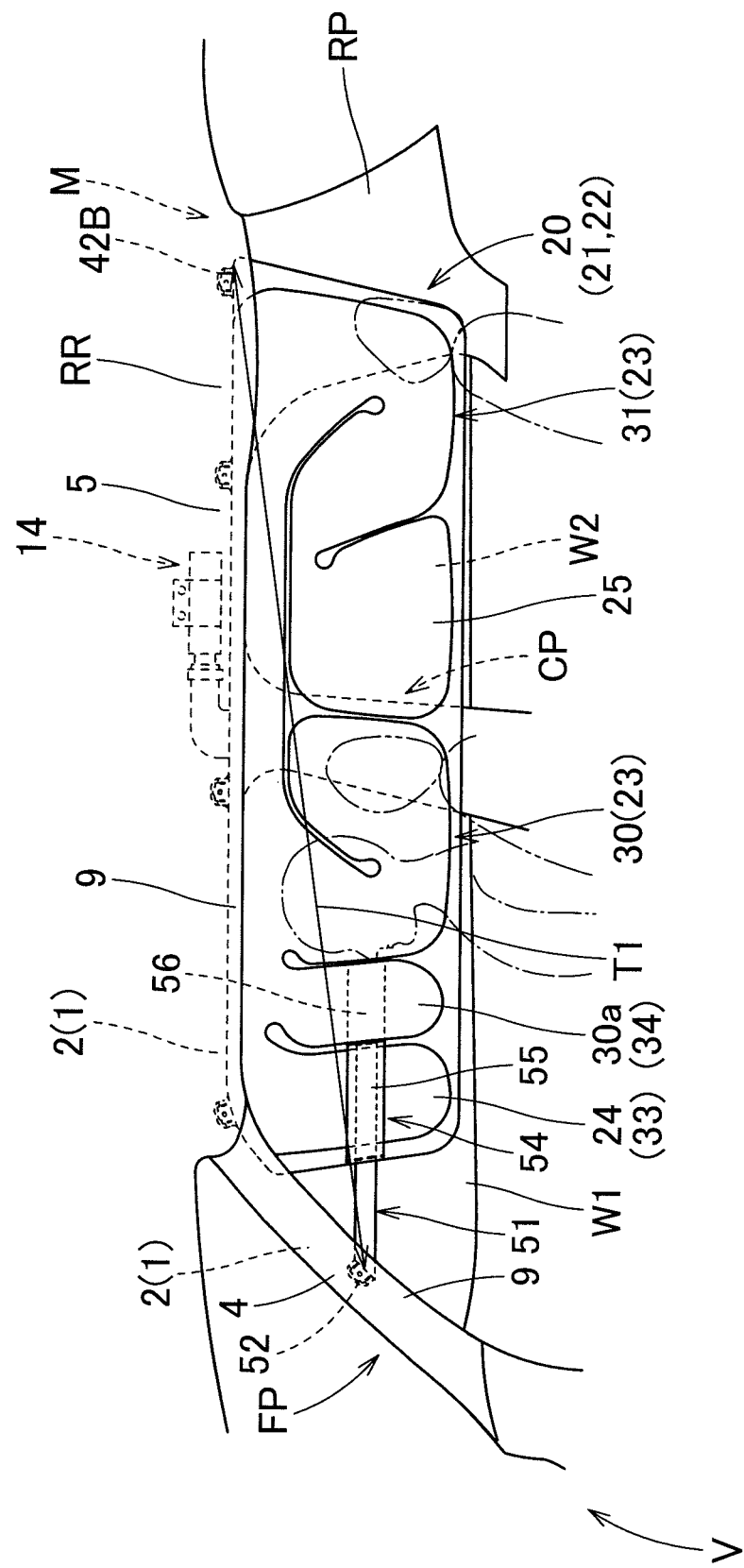
FIG. 5 is a schematic front view of the airbag device of FIG. 1 as the airbag is deployed.

As shown in FIG. 5, the front seat protection portion 30 is deployable at a side of the front seat for protecting a head of an occupant seated in the front seat in the event of a side impact. The rear seat protection portion 31 is deployable at a side of the rear seat for protecting a head of an occupant seated in the rear seat in the event of a side impact. In the illustrated embodiment, an inner area of each of the front seat protection portion 30 and rear seat protection portion 31 are partitioned by later-described partitioning portions 45, 46 and 47, thus regulated in thickness at airbag inflation. The front seat protection portion 30 is partitioned by the partitioning portions into three vertical cells 30a, 30b and 30c disposed side by side in a front and rear direction. The rear seat protection portion 31 is partitioned into two vertical cells 31a and 31b disposed side by side in a front and rear direction. Each of the vertical cells 30a, 30b, 30c, 31a and 31b are inflatable into a rod extending generally vertically.

In the bag body 21 of the illustrated embodiment, the vertical cell 30a located at the front end of the front seat protection portion 30 and at the rear of the front secondary inflatable portion 24 constitutes a central inflatable portion 34. The vertical cell 30a is in gas communication with the gas feed path 28 at the top for admitting an inflation gas from the top and is closed at the bottom. Each of the vertical cells 30b and 31b is in gas communication with the gas feed path 28 at the top for admitting an inflation gas from the top and is in gas communication with adjoining vertical cell 30c/31a at the bottom. Each of the vertical cells 30c and 31a is in gas communication with the vertical cell 30b/31b at the bottom for admitting an inflation gas from the bottom and closed at the top.

The front secondary inflatable portion 24 adjoins the primary inflatable portion 23 (front seat protection portion 30) and is located at the front end 21a of the bag body 21. The front secondary inflatable portion 24 is inflatable into a generally rod extending in a vertical direction. This front secondary inflatable portion 24 located at the front end 21a constitutes a terminal inflatable portion 33. The front secondary inflatable portion 24 or terminal inflatable portion 33 is separated from the vertical cell 30a of the front seat protection portion 30 by the partitioning portion 44 and is in gas communication with the gas feed path 28 via the communication portion 36, which is located at the rear upper end, while being closed at the bottom. The communication portion 36 has a small opening width so as to delay an admission of an inflation gas relative to the front seat protection portion 30.

As shown in FIGS. 2 and 4, the rear secondary inflatable portion 25 is located between the front seat protection portion 30 and the rear seat protection portion 31, below the gas feed path 28. The rear secondary inflatable portion 25 of the illustrated embodiment is in gas communication with the vertical cell 31a of the rear seat protection portion 31 via the communication portion 37 located at the rear upper end. Similarly to the communication portion 36, the communication portion 37 has a small opening width so as to delay an admission of an inflation gas relative to the rear seat protection portion 31.

The non-admissive portion 40 includes mounting portions 42, a peripheral portion 41 and the partitioning portions 44, 45, 46 and 47.

The peripheral portion 41 constitutes an outer peripheral edge of the bag body 21 and is so provided as to enclose the gas admissive portion 27 except the rear end 29a of the connection port 29. The mounting portions 42 serve to mount the upper edge 22a of the inflatable shielding portion 22 on the inner panel 2 of the vehicle body structure 1, and are provided in plurality (four, in the illustrated embodiment) along a front and rear direction. Each of the mounting portions 42 is provided with a mounting hole (reference numeral omitted) for receiving a bolt 12.

Each of the partitioning portions 44, 45 and 46 is so provided as to extend upward from regions of the peripheral portion 41 forming the lower edge 22b of the inflatable shielding portion 22. The partitioning portion 44 separates the front secondary inflatable portion 24 (i.e., the terminal inflatable portion 33) from the vertical cell 30a of the front seat protection portion 30 (i.e., the central inflatable portion 34), and is formed into a rod extending generally vertically. As shown in FIGS. 2 and 4, the leading end of the partitioning portion 44 is located upward relative to a later-described crossbar portion 47b of the partitioning portion 47, and a clearance between the partitioning portion 44 and the peripheral portion 41 forms the communication portion 36 that allows gas admission into the front secondary inflatable portion 24. The partitioning portion 45 separates the vertical cell 30a from the vertical cell 30b in the front seat protection portion 30, and is formed into a rod extending generally vertically. The partitioning portion 46 separates the rear secondary inflatable portion 25 from the vertical cell 31a of the rear seat protection portion 31, and is formed into a rod extending at a slant relative to a vertical direction such that the upper end is directed forward. The partitioning portion 46 extends generally along a later-described sloping portion 47d of the partitioning portion 47. A clearance between the partitioning portion 46 and a later-described crossbar portion 47b of the partitioning portion 47 forms the communication portion 37 that allows gas admission into the rear secondary inflatable portion 25.

The partitioning portion 47 is located in a vicinity of the center in a front and rear direction of the inflatable shielding portion 22, and includes a vertical bar portion 47a extending upward from a region of the peripheral portion constituting the lower edge 22b of the inflatable shielding portion 22, a crossbar portion 47b extending forward and rearward from the upper end of the vertical bar portion 47a and sloping portions 47c and 47d extending downward at a slant from the front and rear ends of the crossbar portion 47b. The vertical bar portion 47a is a rod extending generally vertically and separates the vertical cell 30c of the front seat protection portion 30 from the rear secondary inflatable portion 25. The crossbar portion 47b is a rod extending generally along a front and rear direction and forming the lower edge of the gas feed path 28, and separates the gas feed path 28 from the vertical cell 30c of the front seat protection portion 30, the rear secondary inflatable portion 25 and the vertical cell 31a of the rear seat protection portion 31. The sloping portion 47c extends at a slant from the front end of the crossbar portion 47b, forward and downwardly, and separates the vertical cell 30b from the vertical cell 30c in the front seat protection portion 30. The sloping portion 47d extends at a slant from the rear end of the crossbar portion 47b, rearward and downwardly, and partitions the vertical cell 31a from the vertical cell 31b in the rear seat protection portion 31.

The partitioning portion 44 separating the front secondary inflatable portion 24 (or terminal inflatable portion) 33 from the vertical cell 30a of the front seat protection portion 30 (or central inflatable portion 34) is provided with a slit 49 extending vertically for receiving a tether 54, as shown in FIG. 4. The slit 49 is located at a generally center in an up and down direction of the bag body 21 in such a manner as to split the terminal inflatable portion 33 (the front secondary inflatable portion 24) and the central inflatable portion 34 (vertical cell 30a) are partially split at a central region in an up and down direction.

The tension belt 51 is formed of a flexible band member. The tension belt 51 of the illustrated embodiment is fabricated of a fabric woven of polyamide yarn, polyester yarn or the like. As shown in FIGS. 2 and 3, the root region (the rear end 51b) of the tension belt 51 is connected to the front end 21a region of the bag body 21 whereas the leading end (the front end 51a) is secured to the vehicle body structure 1 at a front edge of the window W1 distant from the front end 21a of the bag body 21, such that the tension belt 51 is arranged generally along a front and rear direction at deployment of the airbag 20 (FIG. 5). The tension belt 51 is arranged generally along a front and rear direction on an outboard side of the terminal inflatable portion 33 (front secondary inflatable portion 24) at airbag deployment. The root region (the rear end 51b) of the tension belt 51 is sewn (connected) to the partitioning portion 44 by sewing threads. The tension belt 51 of the illustrated embodiment is disposed generally along a front and rear direction at a generally center in an up and down direction of the bag body 21, and the rear end 51b is sewn to the front of the slit 49 in the partitioning portion 44. A mounting portion 52 is formed on the front end 51a of the tension belt 51 for mounting to the vehicle body structure 1. Similarly to the mounting portions 42 of the bag body 21, the mounting portion 52 is secured to the inner panel 2 with a mounting bracket 11 and a bolt 12, as shown in FIGS. 1 and 7.

The tether 54 is formed of a flexible band member separately from the tension belt 51. The tether 54 of the illustrated embodiment is fabricated of a fabric woven of polyamide yarn, polyester yarn or the like, similarly to the tension belt 51. As shown in FIGS. 2 and 3, the tether 54 is disposed generally along a front and rear direction in such a manner as to extend across the terminal inflatable portion 33 (front secondary inflatable portion 24) and the central inflatable portion 34 (vertical cell 30a). Specifically, the tether 54 is inserted through the slit 49 formed on the partitioning portion 44 such that the front region 55 covers an inboard side of the terminal inflatable portion 33 (front secondary inflatable portion 24) while the rear region 56 covers an outboard side of the central inflatable portion 34 (vertical cell 30a). The front end 54a of the tether 54 is sewn to a front region of the peripheral portion 41, i.e., to the font edge 33a of the terminal inflatable portion 33 (front secondary inflatable portion 24) with sewing threads, while the rear end 54b is sewn to the partitioning portion 45, i.e., to the rear edge 34b of the central inflatable portion 34 (vertical cell 30a) with sewing threads. Thus the tether 54 is jointed to the bag body 21. Further, the tether 54 is disposed at a generally center in an up and down direction of the bag body 21, such that the tether 54 is so arranged as to overlap with the tension belt 51 in an in- and outboard direction at the terminal inflatable portion 33 (front secondary inflatable portion 24) at airbag deployment, as shown in FIGS. 2 and 3. The width of the tether 54 in an up and down direction is greater than that of the tension belt 51, and the width L1 in a front and rear direction of the tether 54 (FIG. 4) is shorter than a width L2 in a front and rear direction of a region of the bag body 21 from the terminal inflatable portion 33 to the central inflatable portion 34 in an inflated state, i.e., than a distance between the stitches 57 and 58 sewing the front end 54a and rear end 54b of the tether 54 to the bag body 21. The width L1 of the tether 54 is determined smaller than the width L2 on the part of the bag body 21 such that the tether 54 is able to push the terminal inflatable portion 33 and central inflatable potion 34 smoothly toward an interior of vehicle while not hindering smooth inflation of the bag body 21 at airbag deployment. Specifically, the dimension ratio of L1 to L2 should preferably be within a range of 1:3 to 2:3 (desirably, 2:5 to 3:5) regardless of the appearance in the drawings.

When the airbag device M is mounted on a vehicle and the airbag 20 is inflated, the vertical cells 30a, 30b and 30c of the front seat protection portion 30 and cells 31a and 31b of the rear seat protection portion 31 inflate while being reduced in width in a front and rear direction, then a tension T1 is generated between the mounting portion 52 of the tension belt 51 and a mounting portion 42B located rearmost of the bag body 21, generally along a front and rear direction, as shown in FIG. 5. Further, a tension T2 is generated on the tether 54 itself (FIG. 2) generally along a front and rear direction, since the width L1 of the tether 54 in a front and rear direction is shorter than the width L2 in a front and rear direction of the region from the terminal inflatable portion 33 to the central inflatable portion 34 in a condition where the bag body 21 is inflated by itself, i.e., than the distance between the stitches 57 and 58 sewing the front end 54a and rear end 54b of the tether 54 to the bag body 21.

Mounting of the head-protecting airbag device M on a vehicle is now described. The tether 54 and tension belt 52 are sewn to the bag body 21 in advance. From a flattened state where the inboard side wall 27a and outboard side wall 27b overlap each other, the bag body 21 is folded up together with the tether 54 in such a manner as to bring the lower edge 22b close to the upper edge 22a. When the airbag 20 if folded up, a breakable wrapping member (not shown) is wrapped around predetermined regions of the airbag 20 for keeping the folded-up configuration.

Thereafter, the mounting bracket 16 is mounted on the inflator 14 and the inflator 14 is connected with the connection port 29 of the airbag 20 with the clamp 15. The mounting brackets 11 are attached to the mounting portion 52 of the tension belt 51 and mounting portions 42 of the bag body 21. Thus an airbag module is provided.

Subsequently, the mounting brackets 11 and 16 are located at predetermined positions of the inner panel 2 and fixed thereto with the bolts 12 and 17. Then, an unillustrated lead wire extending from a suitable control for actuating the inflator is connected to the inflator 14. If then the front pillar garnish 4, the roof head liner 5 and further the pillar garnishes 6 and 7 are mounted on the inner panel 2, the head-protecting airbag device M is mounted on the vehicle V.

After the airbag device M is mounted on the vehicle V, when the inflator 14 is actuated in response to an actuating signal fed from the control in the event of a side impact, an oblique crash or a rollover of the vehicle V, an inflation gas discharged from the inflator 14 flows into the inflatable shielding portion 22 of the bag body 21, and the inflatable shielding portion 22 then breaks the wrapping member, pushes and opens the airbag cover 9 constructed of the lower hems of the front pillar garnish 4 and roof head liner 5, and deploys downward and covers inboard sides of the windows W1, W2, the center pillar CP, and the rear pillar RP, as shown in FIG. 1 (double-dotted lines) and FIG. 5.

Figure 6:
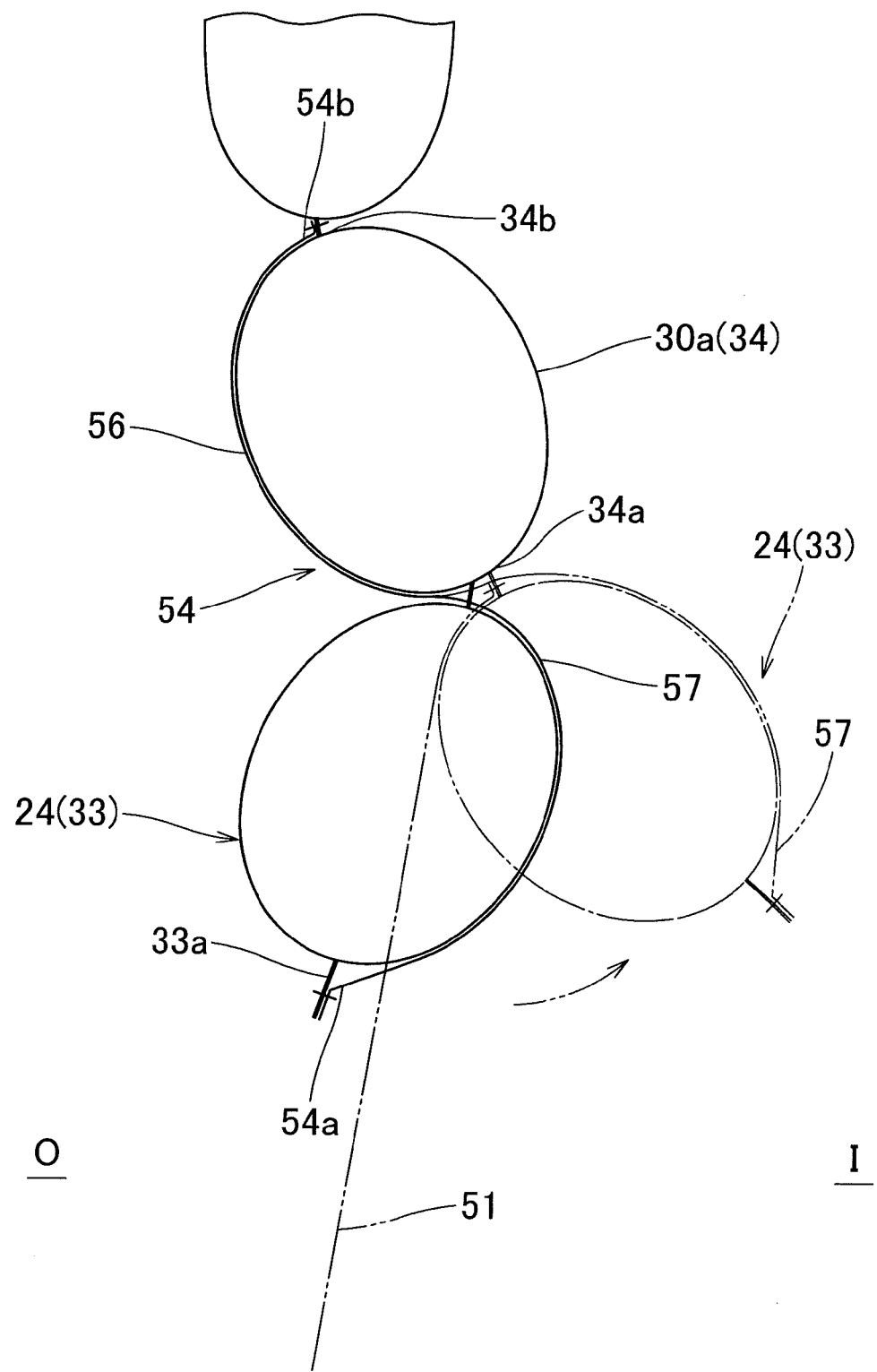
FIG. 6 is a schematic horizontal section of the airbag with and without the tension belt in an inflated state, taken along a front and rear direction.

In the head-protecting airbag device M, the tether 54 is formed of a flexible band member, and the front end 54a is connected to the front edge 33a of the terminal inflatable portion 33 (the front secondary inflatable portion 24) while the rear end 54b is connected to the rear edge 34b of the central inflatable portion 33 (the vertical cell 30a). The tether 54 is run through the slit 49 formed on the partitioning portion 44 located between the terminal inflatable portion 33 and central inflatable portion 34 so as to cover an inboard side of the terminal inflatable portion 33 and an outboard side of the central inflatable portion 34 at airbag deployment. Further, the width L1 in a front and rear direction of the tether 54 is smaller than the width L2 in a front and rear direction of a region from the terminal inflatable portion 33 to the central inflatable portion 34 in an condition where the bag body 21 is inflated by itself. With this configuration, a tension T2 will be exerted in the tether 54 along a front and rear direction at airbag deployment, and since the rear region 56 of the tether 54 is disposed on an outboard side of the central inflatable portion 34, the tether 54 will push the central inflatable portion 34 toward an interior I of vehicle (FIG. 6) with the aid of the tension T2. At this time, since the front region 55 of the tether 54 is disposed on an inboard side of the terminal inflatable portion 33, the terminal inflatable portion 33 will be restrained from protruding toward a vehicle interior I as shown in FIG. 6. However, the tension belt 51 is disposed on an outboard side of the terminal inflatable portion 33 to exert a tension T1 at airbag deployment. This tension T1 exerted in the tension belt 51 along a front and rear direction s greater than the tension T2 exerted in the tether 54. Accordingly, the tension belt 51 will push the terminal inflatable portion 33 considerably toward a vehicle interior I, as shown in FIG. 6 (double-dotted lines) and FIG. 7. Further, the partitioning portion 44 partitioning the terminal inflatable portion 33 from the central inflatable portion 34 is provided with the slit 45 which the tether 54 is run through, thus the terminal inflatable portion 33 is partially split from the central inflatable portion 34. This configuration will enable the terminal inflatable portion 33 to move easily relative to the central inflatable portion 34 and to deploy toward a vehicle interior I considerably and smoothly in such a manner as to direct the front edge 33a inward.

That is, the head-protecting airbag device M is capable of deploying the central inflatable portion 34 toward a vehicle interior I relative to other regions of the bag body 21 in such a manner as to direct the front edge 34a inward with the tension T2 exerted in the tether 54, and deploying the adjoining terminal inflatable portion 33 farther inward with the tension T1 exerted in the tension belt 51 as shown in FIG. 7. Moreover, since the tether 54 is disposed in a vicinity of the center in an up and down direction of the bag body 21, it is capable of pushing the terminal inflatable portion 33 and central inflatable portion 34 toward a vehicle interior I steadily over a wide area in an up and down direction.

As a consequence, at airbag deployment, the terminal inflatable portion 33 is deployed toward a vehicle interior I with the front edge 33a directed considerably toward a vehicle interior I and is so located obliquely forward an occupant MP as to face the occupant MP as shown in FIG. 7, thus the head-protecting airbag device M is capable of catching an occupant's head MH adequately with the terminal inflatable portion 33 in the event of an oblique crash, although the head MP moves obliquely forward and outward in response to the crash.

Therefore, the head-protecting airbag device M embodying the invention is capable of deploying the terminal inflatable portion 33 located at the front end and the central inflatable portion 34 adjoining the terminal inflatable portion 33 considerably toward a vehicle interior I at airbag deployment and consequently protecting an occupant's head MH adequately in the event of an oblique crash.

Since the root region (the rear end 51b) of the tension belt 51 is connected to the partitioning portion 44 partitioning the terminal inflatable portion 33 and central inflatable portion 34, the bag body 21 will be deployed in such a manner as to be bent at the partitioning portion 44, and in such a manner that the root region (the rear end 51b) of the tension belt 51 pushes the rear edge of the terminal inflatable portion 33 toward a vehicle interior. As a consequence, the terminal inflatable portion 33 will be deployed toward a vehicle interior I further smoothly. If such an advantage does not have to be considered, the root region of the tension belt may be connected to an area or the central inflatable portion or to an area of the terminal inflatable portion.

Especially, the front secondary inflatable portion 24 constituting the terminal inflatable portion 33 and the vertical cell 30a constituting the central inflatable portion 34 both communicate with the gas feed path 28 only at upper end regions and other regions than the upper ends are partitioned by the partitioning portions 44 and 45. That is, both of the terminal inflatable portion 33 and central inflatable portion 34 admit an inflation gas only from upper end regions thereof and are closed at the bottoms. With this configuration, the terminal inflatable portion 33 and central inflatable portion 34 will be smoothly pushed toward a vehicle interior by the tension belt 51 and tether 54 over a generally entire area in an up and down direction at airbag deployment. If the deployment of the terminal inflatable portion and central inflatable portion toward a vehicle interior is not considerably hindered, bottom regions of the terminal inflatable portion and central inflatable portion may communicate with other regions.

In the head-protecting airbag device M, the bag body 21 includes, in order to protect a head MH of an occupant MP in the event of a rollover of a vehicle, the primary inflatable portion 23 inflatable with an inflation gas fed from the inflator 14 and the front secondary inflatable portion 24 and rear secondary inflatable portion 25 that is in gas communication with the primary inflatable portion 23 and completes inflation after the primary inflatable portion 23 has completed inflation. Further, the front secondary inflatable portion 24 constitutes the terminal inflatable portion 33, and the vertical cell 30a of the front seat protection portion 30 (part of the primary inflatable portion 23) constitutes the central inflatable portion 34. With this configuration, in the event of a rollover, which allows more time to take measures than in the event of a side impact, the central inflatable portion 34 (the primary inflatable portion 23) located closer to an occupant MP than the terminal inflatable portion 33 (the secondary inflatable portion 24) will be deployed toward a vehicle interior I and quickly arrest the occupant MP within a vehicle interior I. As a result, the head-protecting airbag device M will be capable of protecting an occupant's head MH adequately at a rollover as well. If such an advantage does not have to be considered, the airbag may be configured only to deal with a side impact and an oblique crash, with no distinction of primary and secondary inflatable portions.

In the head-protecting airbag device M, the locations in an up and down direction of the tension belt 51 and tether 54 are generally coincident, such that the tether 54 and tension belt 51 overlap with each other in an area of the terminal inflatable portion 33 in an in- and outboard direction. However, the arrangement of the tension belt and tether should not be limited thereby, and the tension belt may be located downward relative to the tether. Moreover, although the central inflatable portion 34 in the illustrated embodiment is comprised only of the vertical cell 30a located foremost in the front seat protection portion 30, the central inflatable portion 34 may also be configured to include the vertical cell 30b or vertical cells 30b and 30c by connecting the root section or rear end 54b of the tether 54 to the sloping portion 47c of the partitioning portion 47 located at the rear of the vertical cell 30b or to the vertical bar portion 47a of the partitioning portion 47 located at the rear of the vertical cell 30c.

Although the airbag in the foregoing embodiment has the terminal inflatable portion toward the front end of the bag body, the location of the terminal inflatable portion should not be limited thereby. The terminal inflatable portion may be located toward the rear end of the bag body.

What is claimed is:

1. A head-protecting airbag device having an airbag that is mountable on an upper edge of a window of a vehicle on an inboard side of a vehicle in a folded-up configuration with an upper edge of the airbag secured to a vehicle body structure, the airbag being deployable downward over the window when fed with an inflation gas from an inflator, the airbag comprising:

a bag body that is formed into a flexible bag and mountable on the upper edge of the window of the vehicle body structure at a plurality of positions located along a front and rear direction of an upper edge of the bag body, the bag body comprising a terminal inflatable portion located at a terminal in a front and rear direction of the bag body, a central inflatable portion adjoining the terminal inflatable portion and located toward a center in a front and rear direction of the bag body and a partitioning portion that is disposed generally along an up and down direction to partition the terminal inflatable portion from the central inflatable portion;

a tension belt that is formed of a flexible band member and connected to the bag body at a first end so as to be deployable on an outboard side of the terminal inflatable portion and extend along a front and rear direction, a second end of the tension belt being adapted to be secured to the vehicle body structure at a periphery of the window distant from the bag body;

a tether that is formed of a flexible band member separately from the tension belt, a first end in a front and rear direction of the tether being connected to a periphery of the terminal inflatable portion on the part of a terminal in a front and rear direction of the bag body whereas a second end in a front and rear direction of the tether being connected to a periphery of the central inflatable portion on the part of a center in a front and rear direction of the bag body such that the tether extends across the terminal inflatable portion and central inflatable portion generally along a front and rear direction, the tether being disposed in a vicinity of a center in an up and down direction of the bag body and having a width in a front and rear direction that is smaller than a width in a front and rear direction of a region of the bag body from the terminal inflatable portion to the central inflatable portion in an inflated state, and the tether being run through a slit formed on the partitioning portion so as to cover an inboard side of the terminal inflatable portion and an outboard side of the central inflatable portion.

2. The head-protecting airbag device of claim 1, wherein the first end of the tension belt is connected to the partitioning portion.

3. The head-protecting airbag device of claim 1, wherein:
the bag body includes, in order to protect a head of an occupant in the event of a rollover of a vehicle, a primary inflatable portion inflatable with an inflation gas fed from the inflator and a secondary inflatable portion that is in gas communication with the primary inflatable portion and completes inflation after the primary inflatable portion has completed inflation;
the terminal inflatable portion constitutes the secondary inflatable portion; and
the central inflatable portion constitutes the primary inflatable portion.

4. The head-protecting airbag device of claim 1, wherein the terminal inflatable portion is located at the front end of the bag body.

5. The head-protecting airbag device of claim 1, wherein the terminal inflatable portion and central inflatable portion are both closed at the bottoms so as to admit inflation gas from upper end regions thereof.

* * * * *